US011073884B2

(12) United States Patent
Bose et al.

(10) Patent No.: US 11,073,884 B2
(45) Date of Patent: Jul. 27, 2021

(54) ON-CHIP SUPPLY NOISE VOLTAGE REDUCTION OR MITIGATION USING LOCAL DETECTION LOOPS

(71) Applicant: International Business Machines Corporation, Armonk, NY (US)

(72) Inventors: Pradip Bose, Yorktown Heights, NY (US); Alper Buyuktosunoglu, White Plains, NY (US); Pierce I-Jen Chuang, Briarcliff Manor, NY (US); Phillip John Restle, Katonah, NY (US); Christos Vezyrtzis, New Rochelle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 217 days.

(21) Appl. No.: 15/814,069

(22) Filed: Nov. 15, 2017

(65) Prior Publication Data
US 2019/0146568 A1    May 16, 2019

(51) Int. Cl.
G06F 1/28      (2006.01)
G06F 1/32      (2019.01)
G06F 1/3206    (2019.01)
G06F 1/30      (2006.01)

(52) U.S. Cl.
CPC ............. *G06F 1/3206* (2013.01); *G06F 1/28* (2013.01); *G06F 1/305* (2013.01)

(58) Field of Classification Search
None
See application file for complete search history.

(56) References Cited

U.S. PATENT DOCUMENTS

| 6,441,594 B1 | 8/2002 | Connell et al. |
| 6,538,497 B2 | 3/2003 | Thomas et al. |
| 7,027,944 B2 | 4/2006 | Tabaian et al. |

(Continued)

FOREIGN PATENT DOCUMENTS

CN     204030697     12/2014

OTHER PUBLICATIONS

Anonymous, "A Method for Mitigating On-Chip Supply Voltage Noise by Boosting the Supply Voltage through Capacitive Coupling," Nov. 10, 2016, IPCOM000248242D, http://ip.com/IPCOM/000248242, 4 pages.

(Continued)

*Primary Examiner* — Danny Chan
(74) *Attorney, Agent, or Firm* — Amin, Turocy & Watson, LLP

(57) ABSTRACT

Techniques facilitating voltage management via on-chip sensors are provided. In one example, a computer-implemented method can comprise measuring, by a first processor core, power supply information. The computer-implemented method can also comprise measuring, by the first processor core, a value of an electrical current generated by the first processor core. Further, the computer-implemented method can comprise applying, by the first processor core, a mitigation technique at the first processor core in response to a determination that a combination of the power supply noise information and the value of the electrical current indicates a presence of a voltage noise at the first processor core.

14 Claims, 10 Drawing Sheets

(56) References Cited

U.S. PATENT DOCUMENTS

| | | | |
|---|---|---|---|
| 7,378,898 B2 | 5/2008 | Nair | |
| 7,795,762 B2 | 9/2010 | Dreps et al. | |
| 8,581,565 B2 | 11/2013 | Tang et al. | |
| 8,648,645 B2 | 2/2014 | Konstadinidis et al. | |
| 9,164,563 B2 | 10/2015 | Berry, Jr. et al. | |
| 9,430,346 B2 * | 8/2016 | Aliberti | G06F 1/28 |
| 10,171,081 B1 * | 1/2019 | Bose | H03K 17/162 |
| 2008/0263373 A1 * | 10/2008 | Meier | G06F 1/3203 |
| | | | 713/300 |
| 2009/0300329 A1 | 12/2009 | Naffziger et al. | |
| 2010/0217562 A1 * | 8/2010 | Blaauw | G05B 21/02 |
| | | | 702/179 |
| 2010/0229021 A1 | 9/2010 | Konstadinidis et al. | |
| 2011/0122656 A1 | 5/2011 | Chen | |
| 2012/0005515 A1 | 1/2012 | Reddi et al. | |
| 2012/0166854 A1 * | 6/2012 | Rotem | G06F 1/28 |
| | | | 713/340 |
| 2012/0254595 A1 * | 10/2012 | Wu | G06F 1/3206 |
| | | | 712/208 |
| 2012/0254641 A1 * | 10/2012 | Rotem | G06F 1/28 |
| | | | 713/320 |
| 2014/0108834 A1 * | 4/2014 | Trautman | G06F 1/3203 |
| | | | 713/320 |
| 2015/0170716 A1 * | 6/2015 | Lucas | G11C 29/028 |
| | | | 365/226 |
| 2016/0179680 A1 * | 6/2016 | Shows | G06F 12/0862 |
| | | | 711/128 |
| 2016/0274640 A1 * | 9/2016 | Persson | G06F 1/324 |
| 2016/0378133 A1 * | 12/2016 | Gendler | G01R 19/16528 |
| | | | 327/299 |
| 2017/0038814 A1 | 2/2017 | Pal | |
| 2017/0083383 A1 * | 3/2017 | Rider | G06F 9/5094 |
| 2017/0168541 A1 * | 6/2017 | Gendler | G06F 1/3206 |
| 2018/0067532 A1 * | 3/2018 | Chuang | G06F 1/305 |
| 2018/0067541 A1 * | 3/2018 | Chuang | G06F 1/305 |
| 2019/0065086 A1 * | 2/2019 | Margetts | G06F 1/3275 |
| 2019/0108087 A1 * | 4/2019 | Biran | G06F 11/0721 |

OTHER PUBLICATIONS

Anonymous, "Embedded Monitors on Chip for VDD Variation Measurement," Nov. 15, 2012, IPCOM000223301D, http://ip.com/IPCOM/000223301, 3 pages.

IBM, "Self Adjusting Power Scheme for Optimal Power Reduction," Sep. 16, 2004, IPCOM000031185D, http://ip.com/IPCOM/000031185, 9 pages.

Mi et al., "Fully-integrated switched-capacitor voltage regulator with on-chip current-sensing and workload optimization in 32nm SOI CMOS," IEEE/ACM International Symposium on Low Power Electronics and Design (ISLPED), 2015, pp. 140-145, IEEE, 6 pages.

Muhtaroglu et al., "On-die droop detector for analog sensing of power supply noise," IEEE Journal of Solid-State Circuits, Apr. 2004, vol. 39, Issue 4, pp. 651-660, IEEE, 10 pages.

International Search Report and Written Opinion received for PCT Application No. PCT/EP2018/074189, dated Nov. 20, 2018, 12 pages.

Joseph et al., "Wavelet Analysis for Microprocessor Design: Experiences with Wavelet-Based dI/dt Characterization", 10th International Symposium on High Performance Computer Architecture, Feb. 14, 2004, 11 pages.

* cited by examiner

ON-CHIP SUPPLY NOISE VOLTAGE REDUCTION OR MITIGATION USING LOCAL DETECTION LOOPS

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

The subject disclosure relates to on-chip supply noise voltage reduction or mitigation, and more specifically, on-chip supply noise voltage reduction or mitigation using local detection loops in a processor core.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate supply noise voltage reduction and/or mitigation are described.

According to an embodiment, a system can comprise a memory and a processor to execute stored computer executable components. The computer executable components can comprise a voltage management component located at a first processor core of the processor, wherein the voltage management component determines a power supply noise information at the first processor core. The computer executable components can also comprise an electrical current management component located at the first processor core, wherein the electrical current management component determines a value of an electrical current between nodes of the first processor core. The computer executable components can additionally comprise an instruction component that selectively applies a mitigation procedure at the first processor core based on an evaluation of the power supply noise information and the value of the electrical current between the nodes of the first processor core.

According to another embodiment, a computer-implemented method can comprise measuring, by a first processor core, power supply information. The computer-implemented method can further comprise measuring, by the first processor core, a value of an electrical current generated by the first processor core. Moreover, the computer-implemented method can comprise applying, by the first processor core, a mitigation countermeasure at the first processor core in response to a determination that a combination of the power supply noise information and the value of the electrical current indicates a presence of a voltage noise at the first processor core.

According to another embodiment, a computer program product that facilitates reduction of on-chip power supply noise can comprise a computer readable storage medium having program instructions embodied therewith. The program instructions can be executable by a processor core. The program instructions can cause the processor core to determine a power supply noise information at the processor core. The program instructions can also cause the processor core to determine a current between nodes of the processor core. Further, the program instructions can implement a noise mitigation countermeasure at the processor core, wherein the noise mitigation countermeasure is based on an evaluation of the power supply noise information and the current between the nodes.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
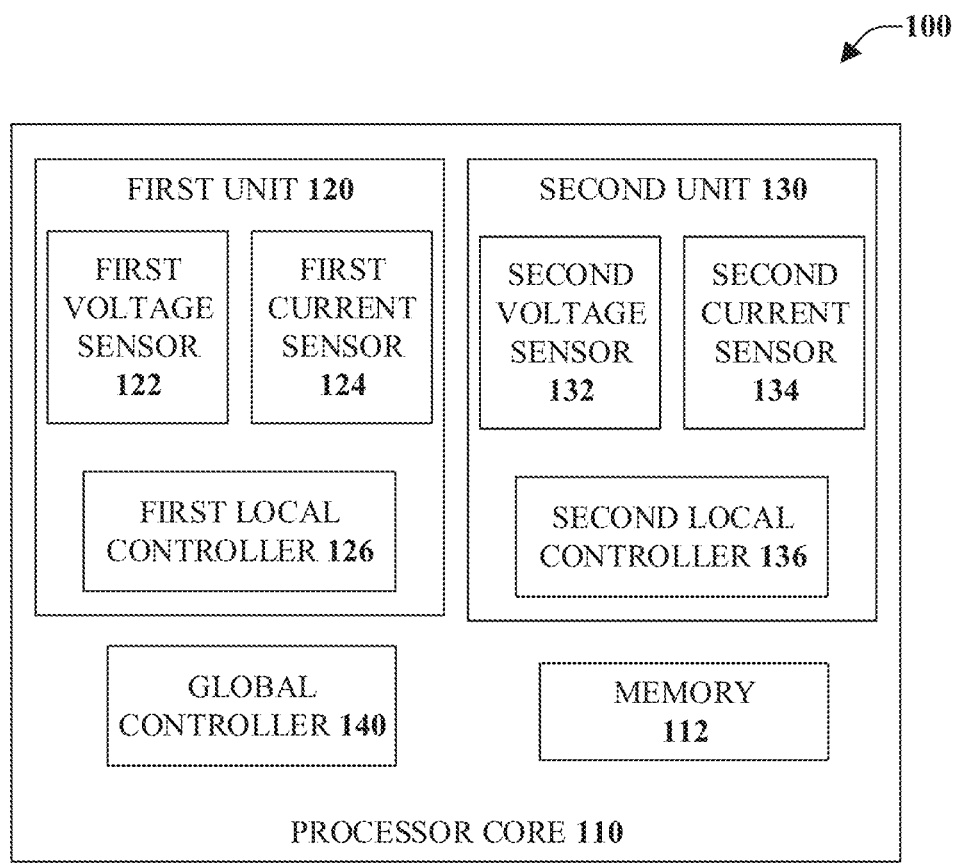
FIG. 1 illustrates a block diagram of an example, non-limiting system that facilitates voltage management via on-chip sensors in accordance with one or more embodiments described herein.

FIG. 1 illustrates a block diagram of an example, non-limiting system 100 that facilitates voltage management via on-chip sensors, in accordance with one or more embodiments described herein. Aspects of systems (e.g., system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

As herein disclosed, integrated circuits (e.g., processors) can receive power from a power source, such as a power supply, to provide a source voltage and a source current for the associated circuitry. An amount of a current drawn by the circuitry when under load can be a function of the performance of the circuitry. Circuit loading can vary, which can be associated with a change in drawn current that can affect a supplied voltage level. A drop in voltage from a defined selectable threshold voltage level can be referred to as "voltage droop." Further, power supply noise can propagate to circuitry receiving voltage from the power supply and can be a cause of voltage droop at circuit nodes within a processor. Voltage droop that causes a voltage to transition a defined floor threshold level can be detrimental to operation of a circuit. As such, voltage can be supplied to a circuit, based on an operational voltage value plus a marginal voltage safety value, to allow for voltage fluctuation, including droop, to occur without compromising an operation of the circuit. The marginal safety voltage band can protect the circuit from voltage dropping below the operational voltage value.

Providing voltage and current at an operational plus a safety margin can be at a higher power level than providing the voltage and current at just the operational value. As such, reducing the marginal voltage safety value can result in supplying less power but can result in less tolerance for voltage fluctuation before the voltage level can drop below the operational voltage value. Adjusting the performance of the circuitry to draw less current during a voltage droop event can decrease the overall amount of the voltage droop, e.g., mitigating the effect of a voltage droop. The faster a voltage droop occurrence can be determined, the quicker a correction can be made to mitigate the voltage droop and better protect the circuitry from dropping below the operating voltage threshold. Where voltage droop mitigation can be applied quickly, the magnitude of the voltage droop can be better constrained allowing the marginal safety value to be reduced while remaining an effective form of protection for the circuit. This can allow the power supply to operate at a lower power level than would generally occur with a slower application of voltage droop mitigation.

Detecting a dangerous voltage droop, e.g., a droop that transitions an operative voltage value, a droop that can result in damage to a circuit, ineffective processing, etc., as compared to a safe voltage droop, e.g., that droops only within the marginal safety band and does not transition the operative voltage value, can result in false positive events where the voltage droop is a safe voltage droop but is believed to be, or to be the start of, a dangerous voltage droop. A number of false positive events can increase where detection parameters are made increasingly strict, e.g., where the parameters ascribed to a dangerous voltage droop are not sufficiently distinct from those ascribed to a safe voltage droop. Where a mitigation technique is applied to the false positive droop event, this can decrease the performance of the circuit. Reducing false positive event determinations can enable the circuit, correspondingly, to perform at a nominal level by not initiating a voltage droop mitigation technique unless there is an actual dangerous voltage droop event beginning to occur.

In various embodiments, the system 100 can be employed in any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, the system 100 can comprise a processor core 110, which can be divided into one or more units, illustrated as a first unit 120 and a second unit 130. The first unit 120 can comprise a first voltage sensor 122, a first current sensor 124, and a first local controller 126. The second unit 130 can comprise a second voltage sensor 132, a second current sensor 134, and a second local controller 136. Further, processor core 110 can comprise a global controller 140 and at least one memory 112. The global controller 140 can be at a logically centralized point within the processor core 110. For example, in some embodiments, the global controller 140 can be located at an edge of the processor core 110.

The first voltage sensor 122 can detect a voltage at a circuit node of the first unit 120. A first voltage droop can be determined based on the detected voltage. Based on a detection of the first voltage droop, the first voltage sensor 122 can transmit information related to the first voltage droop to the first local controller 126 and to the global controller 140. For example, upon or after detection of the first voltage droop, the first voltage sensor 122 can send a first signal to the first local controller 126. Further, the first voltage sensor 122 can send a second signal to the global controller 140. Based on this, the first local controller 126 can implement a first noise mitigation procedure, which can stop, slow, or reverse the first voltage droop, though subject to mitigation latency 212. An indication of application of the first noise mitigation procedure, as implemented by the first local controller 126, can be conveyed to the second local controller 136, directly, via the global controller 140, etc. Moreover, the global controller 140, upon or after receiving the indication from the first voltage sensor 122, can determine if a global countermeasure procedure should be implemented within the processor core 110. Similarly, voltage detected via second voltage sensor 132 can be communicated to first local controller 126 directly, via the global controller 140, etc.

In an aspect, the detection of a voltage droop by first voltage sensor 122 can be a dangerous voltage droop, a safe voltage droop, etc. As such, it can be desirable to confirm that the detected voltage droop should be addressed, e.g., via a voltage droop mitigation technique. In an aspect, applying a voltage droop mitigation technique in response to a false positive event, e.g., a safe voltage droop, can unnecessarily result in slowing the performance of the processor as part of the mitigation technique. As such, validating the detected voltage droop as a dangerous, or potentially dangerous, voltage droop can allow the processor to perform with less reduction in performance while also allowing the processor to draw less power by reducing the marginal voltage safety level.

As such, in an embodiment, first current sensor 124 can determine a current between nodes of the first unit of the processor core 110. First current sensor 124, in an embodiment, can be a current sensor. However, first current sensor 124, in another embodiment, can be a current proxy component. A current sensor can measure electrical current, while a current proxy component can infer or determine a current based on a non-current criterion. As an example, a non-current criterion can be a number of operations per unit time. Where it is determined that an increase in electrical current is correlated to an increase in operations per unit time, the number of operations per unit time can be a proxy for electrical current, e.g., where the number of operations per unit time increases, so does the electrical current drawn increase. Where there is a detected voltage droop and a corresponding increase in electrical current drawn, it can be determined that the voltage associated droop is a dangerous, or potentially dangerous, voltage droop and not a false positive (or safe) voltage droop. Accordingly, a voltage droop mitigation technique can be initiated in response to validating the detected voltage droop as a dangerous, or potentially dangerous, voltage droop. Further, the validation of the voltage droop, e.g., as a dangerous voltage droop, etc., can be communicated to other units, e.g., second unit 130, etc., directly or via global controller 140.

The at least one memory 112 can store computer executable components and/or computer executable instructions, which can be implemented by the processor core 110. The at least one memory 112 can store protocols associated with implementing on-chip voltage management as discussed herein. Further, the at least one memory 112 can facilitate action to control communication between the first unit 120, the second unit 130, and the global controller 140, such that the system 100 can employ stored protocols and/or algorithms to achieve voltage management via on-chip sensors as described herein.

As discussed above, the first local controller 126 in the first unit 120 and/or the second local controller 136 in the second unit 130 can detect and/or validate a voltage droop and implement a respective voltage droop mitigation procedure. For example, FIG. 2 illustrates an example, non-limiting chart 200 of voltage droop detection and mitigation that can reflect the protective nature of system 100, e.g., if the power supply decreases below a defined voltage value, the processor's functionality can be compromised and system 100 can enable the processor core 110 to operate at a lower power and to reduce or eliminate degrading performance in response false positive voltage droop event detections.

Figure 2:
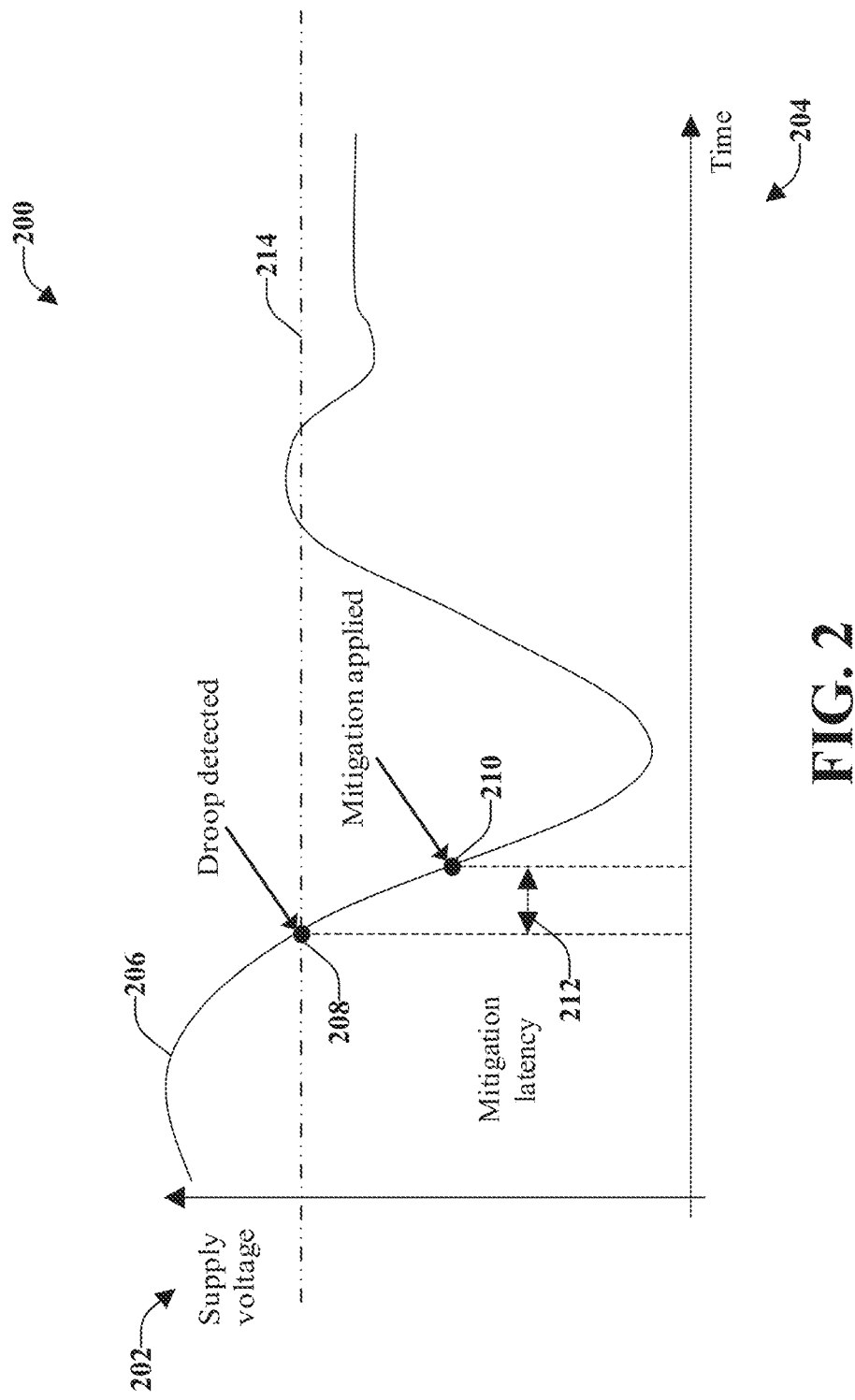
FIG. 2 illustrates an example, non-limiting chart of threshold triggered voltage droop detection and mitigation that comprises a delay or lag between detection of the voltage droop and implementation of mitigation procedures in accordance with one or more embodiments described herein.

Turning to FIG. 2, illustrated is an example, non-limiting chart of threshold triggered voltage droop detection and mitigation that comprises a delay or lag between detection of the voltage droop and implementation of mitigation procedures. Repetitive description of like elements employed in other embodiments described herein is omitted for sake of brevity.

A supply voltage level 202 is illustrated on the vertical axis of the chart 200, and time 204 is illustrated on the horizontal axis. The plotted line 206 illustrates a supply voltage value for a processor core (or a portion of the processor core). As the supply voltage value is monitored, a voltage droop can be detected, as indicated at 208, where the voltage level has transitioned a selectable threshold voltage level 214. Based on the detection, an indication of the voltage droop can be transmitted to controller(s), e.g., first local controller 126, second local controller 136, global controller 140, etc., which can provide instructions for mitigation of the determined voltage droop. Moreover, validation of the determined voltage droop can be used to detect false positive voltage droop events and to forestall application of a mitigation technique where the determined voltage droop is deemed to be a false positive event, e.g., a safe voltage droop. The reduction/mitigation procedure can be implemented, as indicated at 210, after a time delay. The mitigation latency 212 between when the voltage droop is detected (at 208) and when reduction/mitigation is applied (at 210) can be a result of communication, processing, and validation of the detected voltage droop. During these delays, the voltage of the supply can, in some instances droop further. The various aspects provided allow the droop detection to occur closer to the normally supply voltage because the detected voltage droop can be validated via other sensors to prevent extraneous responses to false positive events. As a result, the processor can draw less power and can perform at nominal levels where mitigation is not applied to false positive voltage droop events.

Figure 3:
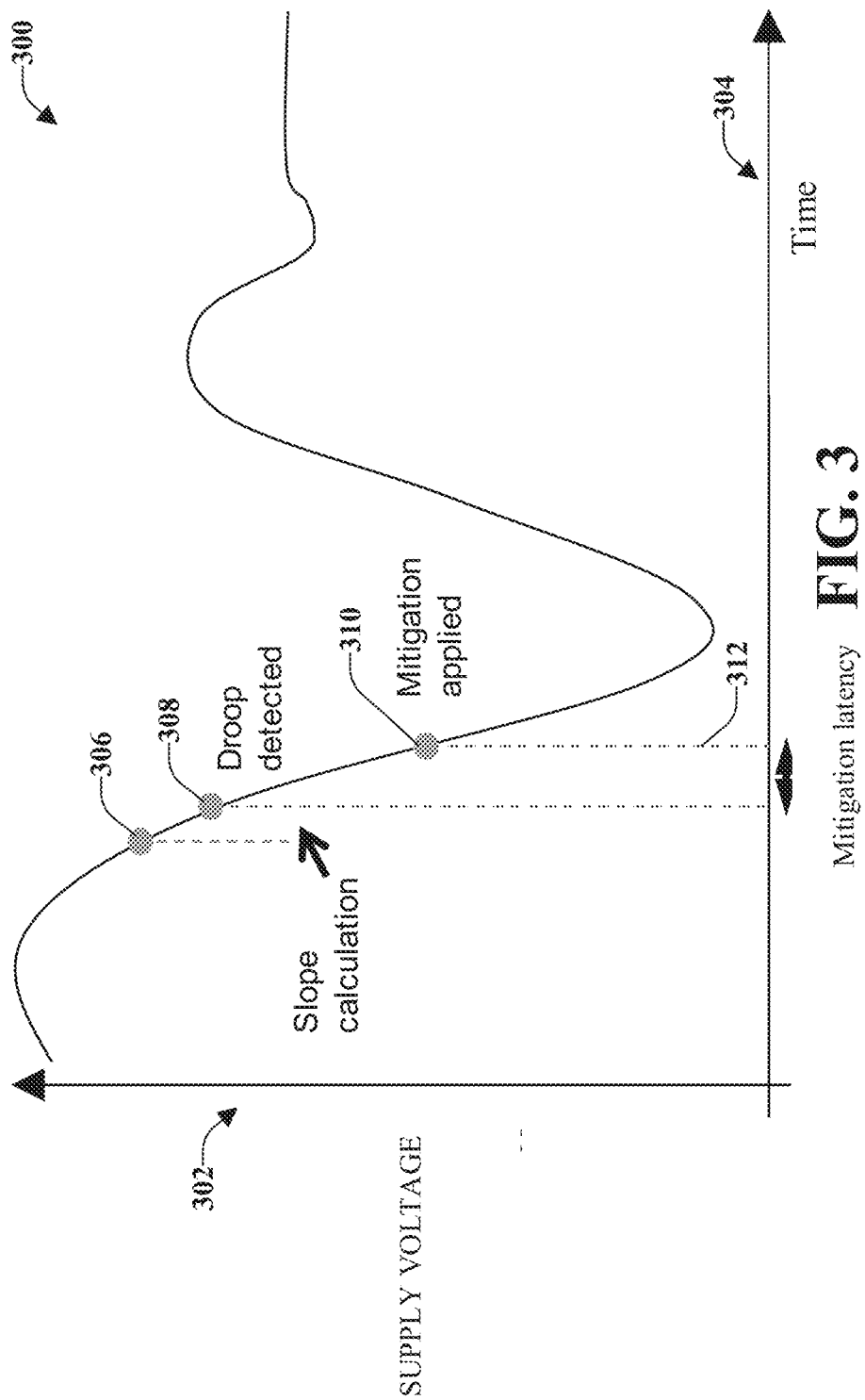
FIG. 3 illustrates an example, non-limiting chart of slope triggered voltage droop detection and mitigation that comprises a delay or lag between detection of the voltage droop and implementation of mitigation procedures.

FIG. 3, illustrates an example, non-limiting chart of slope triggered voltage droop detection and mitigation that comprises a delay or lag between detection of the voltage droop and implementation of mitigation procedures. Repetitive description of like elements employed in other embodiments described herein is omitted for sake of brevity.

A supply voltage level 302 is illustrated on the vertical axis of the chart 300, and time 304 is illustrated on the horizontal axis. The plotted line 306 illustrates a supply voltage value for a processor core (or a portion of the processor core). As the supply voltage value is monitored, a voltage droop can be detected, as indicated at 308, where the voltage level between 306 and 308 has a sufficient slope per unit time, e.g., the slope of the plotted line between 306 and 308 is determined to satisfy a rule related to a change in voltage over a change in time (dV/dt). Based on the detection, an indication of the voltage droop can be transmitted to controller(s), e.g., first local controller 126, second local controller 136, global controller 140, etc., which can provide instructions for mitigation of the determined voltage droop. Moreover, validation of the determined voltage droop can be used to detect false positive voltage droop events and to forestall application of a mitigation technique where the determined voltage droop is found to be a false positive voltage droop event. The reduction/mitigation procedure can be implemented, as indicated at 310, after a time delay. The mitigation latency 312 between when the voltage droop is detected (at 308, based on the slope between 306 and 308) and when reduction/mitigation is applied (at 310) can be a result of communication, processing, and validation of the detected voltage droop. During these delays, the voltage of the supply, in some instances, can droop further, as illustrated. The various aspects provided herein allow the droop detection to occur closer to the normally supply voltage because the detected voltage droop can be validated via other sensors to prevent extraneous responses to false positive events. As a result, the processor can draw less power and can perform at nominal levels where mitigation is not applied to false positive voltage droop events.

Figure 4:
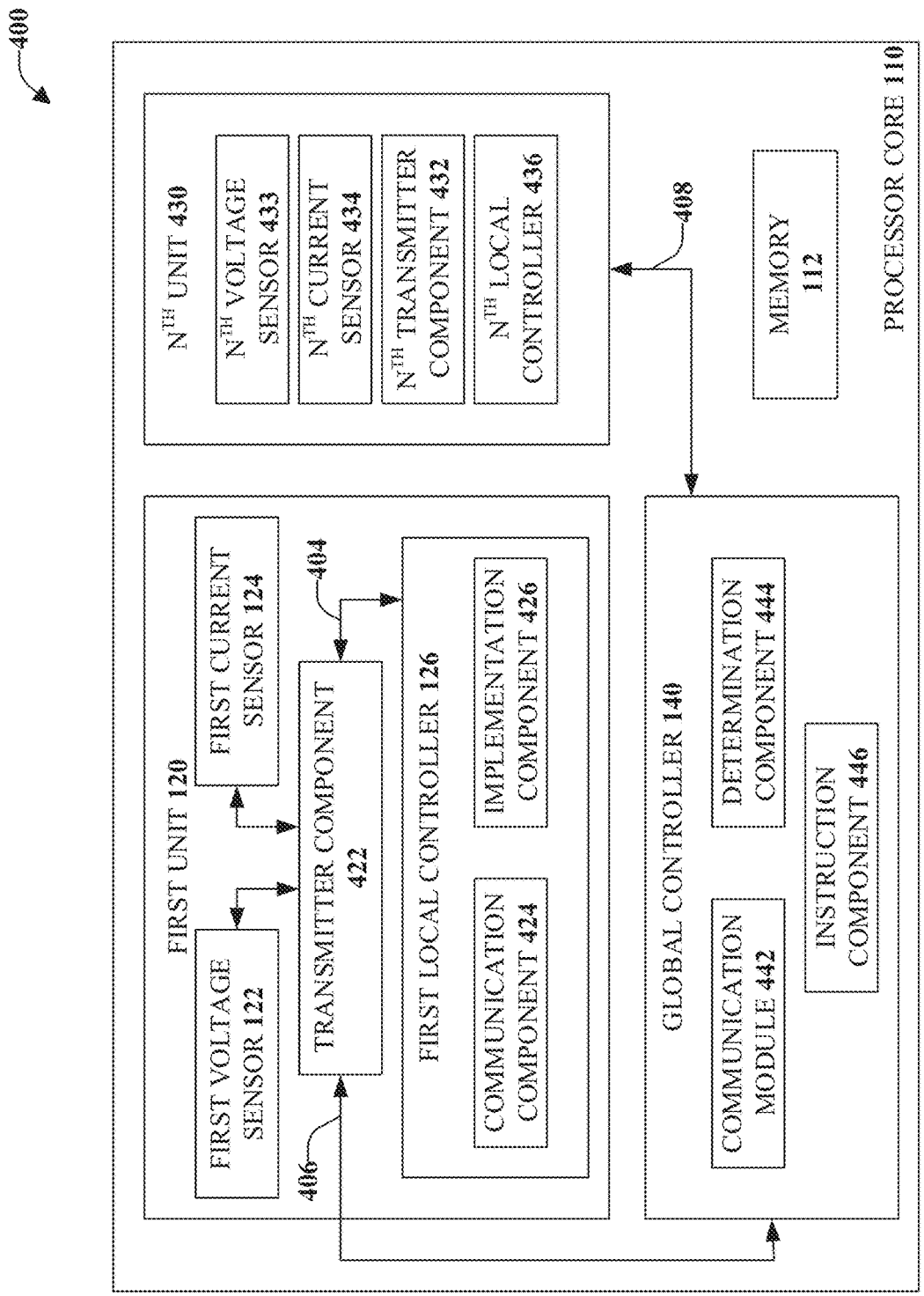
FIG. 4 illustrates a block diagram of an example, non-limiting system that facilitates voltage management via on-chip sensors and/or sharing voltage droop mitigation states among one or more processor cores, in accordance with one or more embodiments described herein.

FIG. 4 illustrates a block diagram of an example, non-limiting system 400 that facilitates voltage management via on-chip sensors and/or sharing voltage droop mitigation states among one or more processor cores, in accordance with one or more embodiments described herein. Repetitive description of like elements employed in other embodiments described herein is omitted for sake of brevity.

The system 400 can comprise one or more of the components and/or functionality of the system 100, and vice versa. As illustrated, the processor core 110 can include two or more units, illustrated as the first unit 120 and an Nth unit 430 (that can be the same as, or similar to, second unit 130), where N is an integer. For example, the processor core 110 can comprise three or more units according to some implementations. The Nth unit 430 can comprise an Nth voltage sensor 433 (that can be the same as, or similar to, second voltage sensor 132), an Nth current sensor 434 (that can be the same as, or similar to, second current sensor 134), and an Nth controller 436 (that can be the same as, or similar to, second local controller 136). As discussed above, the Nth unit 430 can include one or more of the components and/or functionality of the first unit 120, as illustrated and described with respect to FIG. 1

The first unit 120 can communicate with the global controller 140 via transmitter component 422 and control loop 406. Further, the Nth unit 430 can communicate with the global controller 140 over control loop 408. The first unit 120 can also communicate with the first local controller 126 via transmitter component 422 and control loop 404, and the Nth unit 430 can also communicate with the Nth local controller 436 via Nth transmitter component 432. Communication between the first unit 120 and the Nth unit 430 can be via global controller 140, or other control loops not illustrated for the sake of clarity and brevity.

First local controller 126 can comprise communication component 424 that can facilitate communication of voltage droop information, validation information related to the validation of a voltage droop, instituted mitigation information related to initiation of a mitigation technique, etc. Communication component 424 can aid in routing of information within the first unit 120, between the first unit 120 and the Nth unit 430, between the first unit 120 and the global controller 140, or elsewhere on, or off, of processor core 110.

First local controller 126 can comprise implementation component 426 that can facilitate initiation of a mitigation technique in response to detection of a voltage droop event and/or validation of a voltage droop event. In an aspect, mitigation of voltage droop is generally beyond the scope of the instant disclosure, but all such mitigation techniques are within the scope of the present disclosure even where not explicitly recited for the sake of clarity and brevity. As an example, a voltage droop mitigation technique can comprise throttling a number of instructions per unit time to reduce current drawn per unit time. As another example, load balancing can shift some operations to a less burdened processor unit, e.g., the Nth unit 430, etc., to reduce the loading on the first unit 120 and effect a reduction in current drawn to mitigate the voltage droop. As a still further example, a timing margin can be relaxed to reduce current drawn by a processor. Other examples are readily appreciated and can be equally applicable where the voltage droop is validated as disclosed herein.

Global controller 140 can comprise communication module 442 that can aid in routing of information among the first to Nth unit, e.g., 120-430, of processor core 110, between a unit of processor core 110 and other processors, not illustrated, etc. This can facilitate monitoring of voltage droop events among one or more units, e.g. 120-430, etc., among one or more processor cores, e.g., 110, etc., or across one or more platforms comprising one or more processor cores. As such, voltage fluctuations, dangerous droops, detected false positive events, and the like can be determined and analyzed to further improve application of the disclosed subject matter, for example, in determining selectable threshold levels, which can affect an accuracy of detecting false positives, in selecting a marginal voltage safety level, to update rules related to current proxy correlation with an actual electrical current being drawn, etc.

Moreover, global controller 140 can comprise determination component 444 and instruction component 446 that can determine which instructions to issue in relation to applying a voltage droop mitigation technique. As an example, determination component can determine a mitigation technique and can access corresponding instructions via instruction component 446 from memory 112. Global controller 140 can then disseminate these selected instructions to one or more of the first to Nth unit, e.g., 120-430, etc., via communication module 442. As such, the first to Nth unit can be provisioned, via the global controller 140, with instructions to locally implement an initiated voltage droop mitigation technique. This can facilitate coordination of mitigation techniques, updating a unit to comprise a favored mitigation technique, etc.

Figure 5:
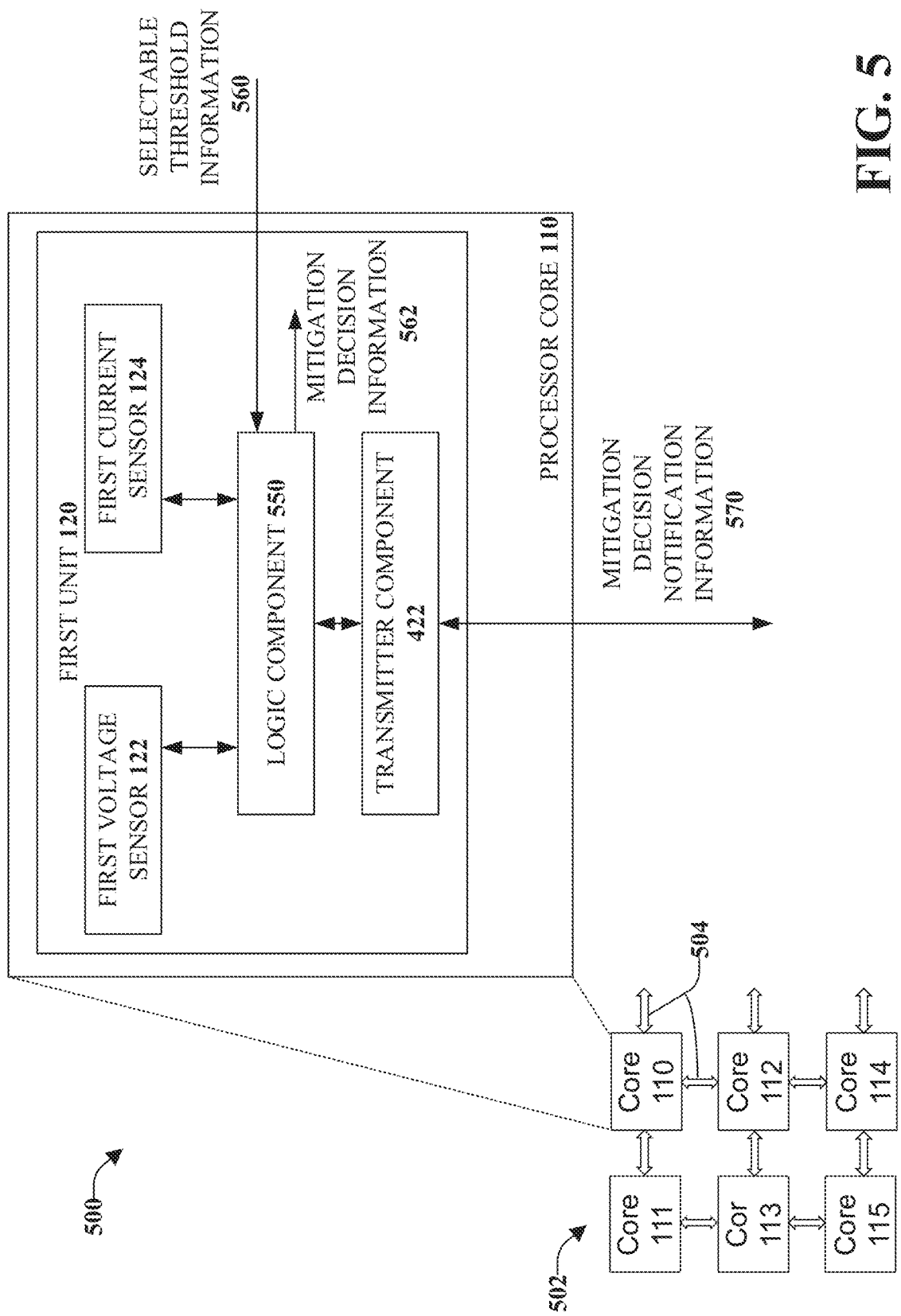
FIG. 5 illustrates a block diagram of an example, non-limiting system enabling voltage management via on-chip sensors, based on selectable threshold information, among one or more processor cores, in accordance with one or more embodiments described herein.

FIG. 5 illustrates a block diagram of an example, non-limiting system 500 utilized for voltage management via on-chip sensors, based on selectable threshold information, among one or more processor cores, in accordance with one or more embodiments described herein. Repetitive description of like elements employed in other embodiments described herein is omitted for sake of brevity.

The system 500 can comprise one or more of the components and/or functionality of the system 100, the system 400, and vice versa. As illustrated, the processor core 110 can comprise the first unit 120. First unit 120 can comprise first voltage sensor 122 that can detect a voltage at a node of first unit 120, e.g., a voltage along 206, 306, etc. In an embodiment, the voltage at the node can be determined, by logic component 550, to satisfy a rule related to a threshold voltage level, e.g., 214, etc., can be determined to satisfy a rule related to a voltage slope, e.g., the change per unit time between 306 and 308, etc., or other voltage characteristics for the node. Logic component 550 can receive selectable threshold information 560, which can be related to a threshold voltage level, e.g., 214, etc., at which to indicate that a voltage droop event has been detected. Similarly, selectable threshold information 560 can be related to a threshold voltage slope level, e.g., dV/dt between 306 and 308, etc., which can indicate that a voltage droop event has been detected.

The first unit 120 can comprise first current sensor 124. First current sensor 124 can measure electrical current or can measure a value that is a proxy for electrical current as disclosed herein. Logic component 550 can use current, or current proxy, information to validate a corresponding detected voltage droop event. As an example, where a voltage droop is detected but there is not a sufficiently significant corresponding current draw, the voltage droop can be deemed a safe voltage droop, e.g., a false positive event. The sufficiency of the corresponding current draw can be based on determining if the current or current proxy information satisfies a rule related to sufficiency. As example, an instant current/proxy value transitioning a selectable threshold value can indicate sufficiency, a change in current per unit time transitioning a selectable threshold value can indicate sufficiency, an average current for a selectable period transitioning a selectable threshold value can indicate sufficiency, etc. While many more examples of sufficiency rules can be illustrated, for the sake of clarity and brevity they cannot all be enumerated, however, all such rules are considered within the scope of the present disclosure despite not being explicitly recited.

At 502 of system 500, cores 110-115 can communicate with each other to inform other cores of local mitigation decision notification information, e.g., 570, etc. Accordingly, it is to me noted that one or more of cores 110-115 can comprise components embodied in first unit 120, etc., as disclosed herein. This can allow one or more of cores 110-115 to locally determine a response to a detected voltage droop, e.g., detection, validation, and/or mitigation of a voltage droop via sensors local to the particular core. Moreover, the local response can be communicated to other cores. In an aspect, this can allow other cores to, for example, determine that a voltage droop they have detected may be associated with safe voltage supply noise where one or more of cores 110-115 indicate that the voltage droop is a false positive event. As another example, a validated voltage droop at a core of sores 110-115 can be employed by another core to respond more rapidly to a detected voltage droop, e.g., where one core has validated the voltage droop, it can be less likely that a voltage droop detected at another core can be a false positive. Further, although not illustrated, a core of a first processor can communicate mitigation decision notification information 570 to one or more core(s) of a second processor. Moreover, the first and second processor can be comprised in different systems, although generally, they can be sharing a source of power, e.g., where a power supply is used by two computing devices, a first core of a first processor of a first computing device can communicate mitigation decision notification information 570 to a second core of a second processor of a second computing device, even in addition to communicating mitigation decision notification information 570 to a third core of the first processor of the first computing device and/or to a fourth core of a third processor of the first computing device.

Where the voltage droop is determined to satisfy the sufficiency rule it can be determined to be a validated, e.g., dangerous, voltage droop and voltage droop mitigation can be initiated or otherwise allowed to ensue. In some embodiments, determining that the detected voltage droop is a false positive event can cause application of a mitigation technique to be halted, prevented, or reversed. As such, mitigation can occur premised on validation of the voltage droop, or mitigation can be allowed to continue premised on validation of the voltage drop. Mitigation decision information can 562 can comprise information related to starting, stopping, altering, reversing, allowing, etc., a mitigation technique based on the detection of the voltage droop via first voltage sensor 122 and validation of the voltage droop via first current sensor 124. Moreover, mitigation decision notification information 570 can be communicated from first unit 120 via transmitter component 422, e.g., as inter-core communication 504 among different cores 110-115, etc. as shown at 502. Mitigation decision notification information 570 can enable other systems, cores, devices, etc., to be appraised of the mitigation techniques being applied via mitigation decision information 562.

Figure 6:
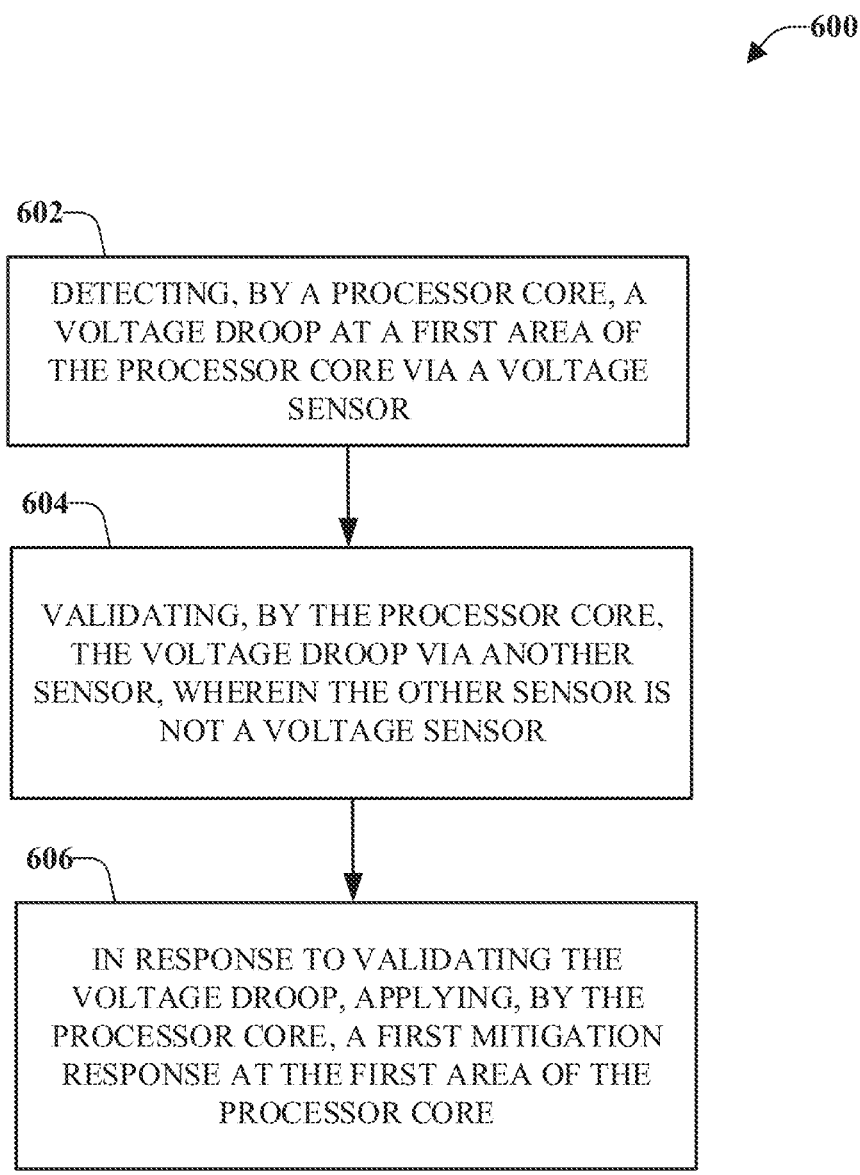
FIG. 6 illustrates a flow diagram of an example, non-limiting computer-implemented method that facilitates voltage management via on-chip sensors, in accordance with one or more embodiments described herein.

FIG. 6 illustrates a flow diagram of an example, non-limiting computer-implemented method 600 that facilitates voltage management via on-chip sensors, in accordance with one or more embodiments described herein. Repetitive description of like elements employed in other embodiments described herein is omitted for sake of brevity.

At 602 of computer-implemented method 600, a voltage droop at a first area of a processor core can be detected (e.g., via the first voltage sensor 122, etc.) For example, a processor can be divided into two or more different areas or units. Respective voltage sensor components can be included in the two or more different areas. For example, a first voltage sensor component can be located in a first area, a second voltage sensor component can be located in a second area, and a subsequent voltage sensor component can be located in a subsequent area. According to some implementations, one or more areas can comprise two or more voltage sensor components. Further, areas of the two or more areas can comprise a different quantity of voltage sensor components. For example, a first area can comprise one voltage sensor component and a second area can comprise three voltage sensor components. In another example, a first area can comprise two voltage sensor components, a second area can comprise three voltage sensor components, and a third area can comprise two voltage sensor components.

At 604 of the computer-implemented method 600, voltage droop information can be validated via another sensor, e.g., a current sensor, a current proxy sensor, etc., wherein the other sensor is not a voltage droop sensor (e.g., via the first current sensor 124, etc.) Where, for example, a processor can be divided into two or more different areas or units. Respective current sensor components can be included in the two or more different areas. For example, a first current sensor component can be located in a first area, a second current sensor component can be located in a second area, and a subsequent current sensor component can be located in a subsequent area. According to some implementations, one or more areas can comprise two or more current sensor components. Further, areas of the two or more areas can comprise a different quantity of current sensor components. For example, a first area can comprise one current sensor component and a second area can comprise three current sensor components. In another example, a first area can comprise two current sensor components, a second area can comprise three current sensor components, and a third area can comprise two current sensor components. Validation can be based, for example, on determining that a current is sufficiently significant, e.g., determining if the current or current proxy information satisfies a rule related to sufficiency.

Further, at 606 of the computer-implemented method 600, in response to validating the voltage droop, e.g., determining that the voltage droop is not a false positive event, a first mitigation response can be applied at the first area of the processor core (e.g., via first local controller 126, etc.) At this point, method 600 can end. Application of the first mitigation response can occur in response to a local instruction received from the local controller 126, etc., logic component 550, etc. or other components. The instruction can also be provided to other local controllers, e.g., 136, etc., to the global controller, e.g., 140, etc., and/or to another device or system as disclosed herein.

Figure 7:
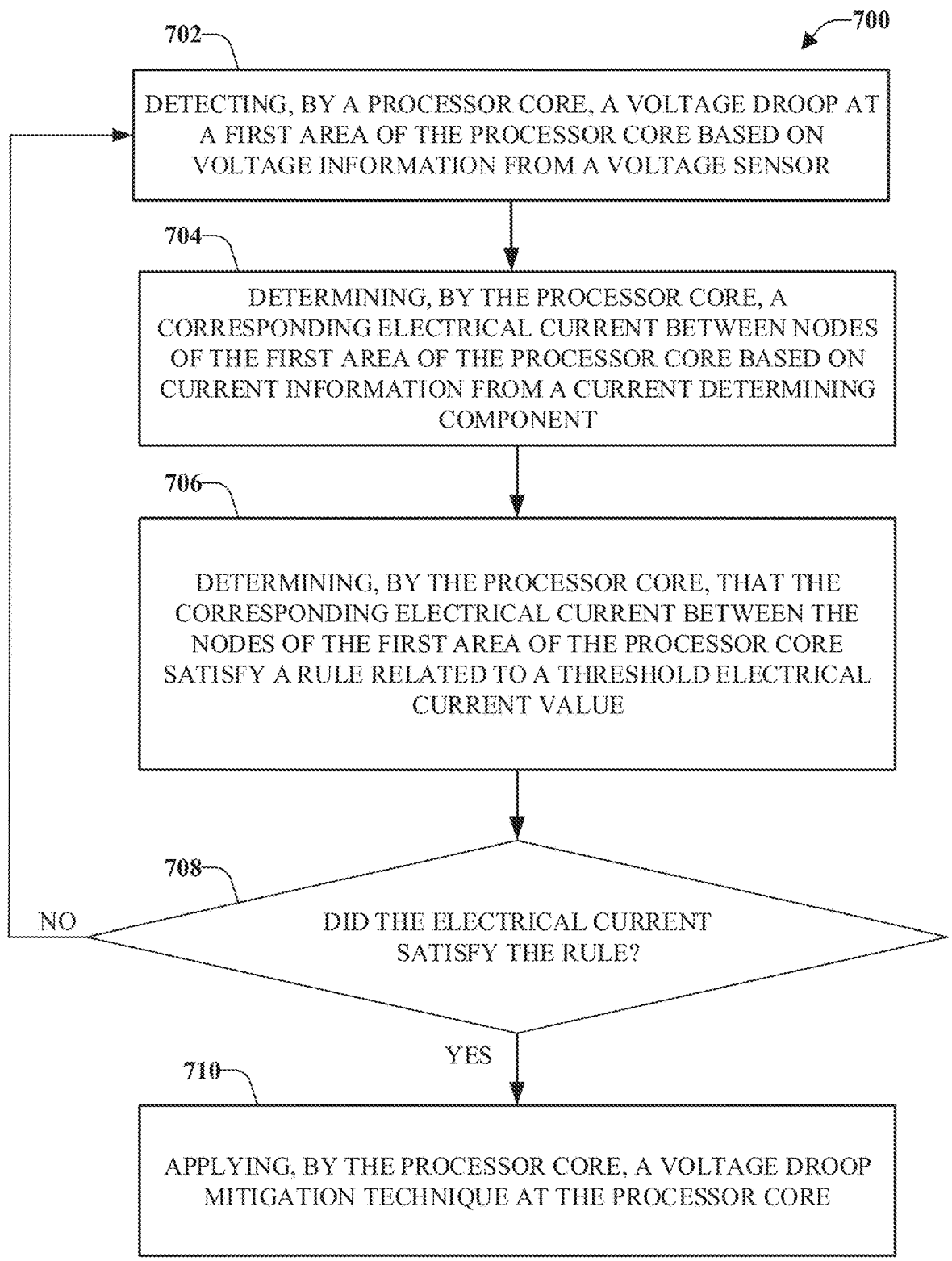
FIG. 7 illustrates a flow diagram of an example, non-limiting computer-implemented method that implements voltage management via on-chip sensors and satisfaction of a threshold electrical current rule, in accordance with one or more embodiments described herein.

FIG. 7 illustrates a flow diagram of an example, non-limiting computer-implemented method 700 that implements voltage management via on-chip sensors and satisfaction of a threshold electrical current rule, in accordance with one or more embodiments described herein. Repetitive description of like elements employed in other embodiments described herein is omitted for sake of brevity.

At 702 of computer-implemented method 700, a voltage droop can be detected at a first area of a processor core (e.g., via the first voltage sensor 122, etc.) According to some implementations, detecting the voltage droop can comprise an analog or digital measurement of at least one voltage value and/or determining a voltage slope from two or more voltage measurements as disclosed herein.

At 704 of computer-implemented method 700, a corresponding electrical current can be determined (e.g., via the first current sensor 124, etc.) Electrical current can be either measured electrical current or, in some embodiments, determined by a proxy metric for electrical current, such as a number of instructions per unit time, etc., as disclosed herein.

Further, at 706 of computer-implemented method 700, it can be determined if the corresponding electrical current, or current proxy, satisfies a rule related to a threshold electrical current value (e.g., via first local controller 126, etc., logic component 550, etc.) The threshold electrical current value can be a selectable threshold electrical current value. Moreover, the threshold electrical current value can be a threshold value, a threshold slope value, etc.

A determination can be made, at 708 of computer-implemented method 700, whether the rule related to a threshold electrical current value has been satisfied (e.g., via first local controller 126, etc., logic component 550, etc.). Where the rule has not been satisfied, method 700 can return to 702. Where the rule has been satisfied, method 700 can continue to 710. At 710 of computer-implemented method 700, a voltage droop mitigation technique can be applied (e.g., via first local controller 126, etc.), affecting the first area of the processor core. At this point method 700 can end.

According to some implementations, a second mitigation technique can further be applied where the effects of the first mitigation technique are determined to not resolve the voltage droop, e.g., a voltage droop continues to be determined. For example, applying the second mitigation technique can comprise applying a second mitigation technique at the first area of the processor core. Further to this embodiment, a third mitigation technique can be applied at a second area of the processor core. The second mitigation technique and the third mitigation technique can be based on respective instructions. In an embodiment, a local instruction received from the local controller, e.g., 126, 136, etc., can be overridden by an instruction received from a global controller, e.g., 140, etc.

Figure 8:
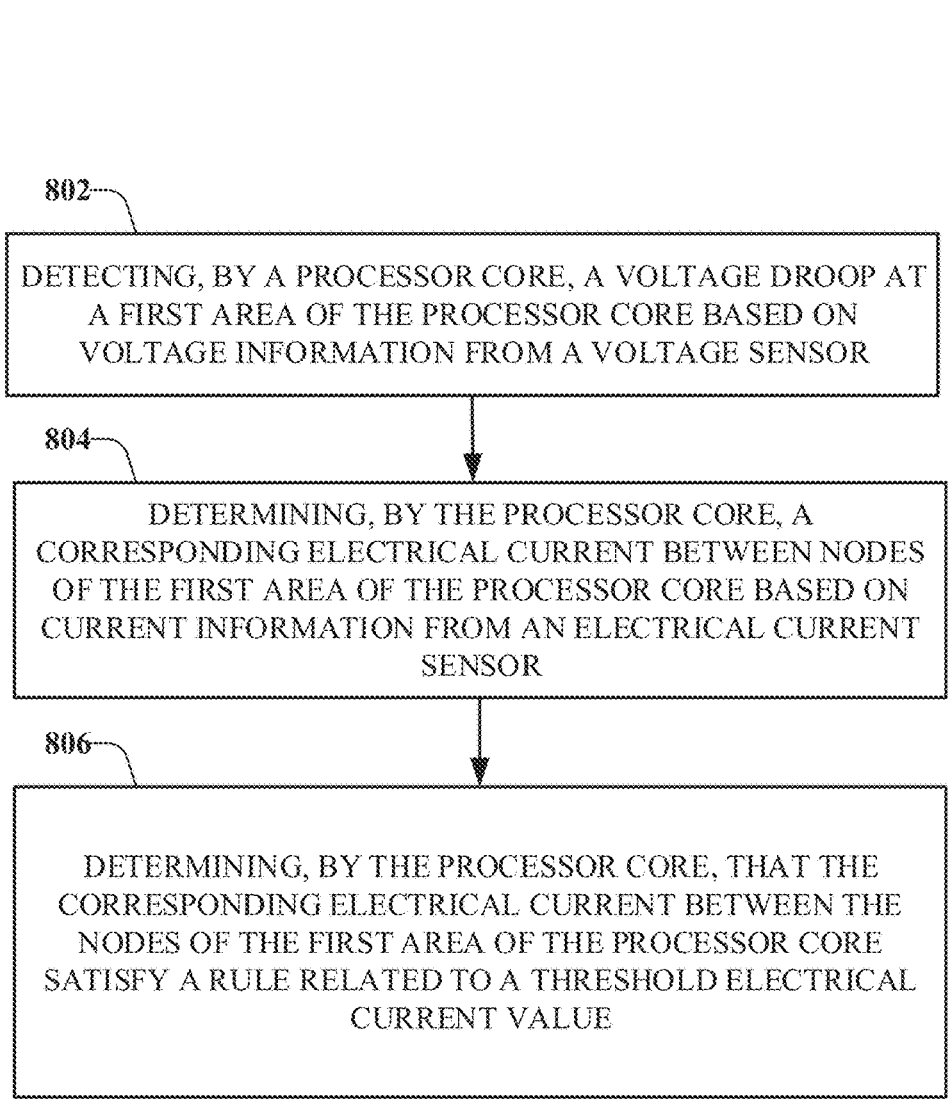
FIG. 8 illustrates a flow diagram of an example, non-limiting computer-implemented method that implements voltage management via on-chip sensors and satisfaction of a threshold electrical current rule based on electrical current measured via an electrical current sensor, in accordance with one or more embodiments described herein.

FIG. 8 illustrates a flow diagram of an example, non-limiting computer-implemented method 800 that implements voltage management via on-chip sensors and satisfaction of a threshold electrical current rule based on electrical current measured via an electrical current sensor, in accordance with one or more embodiments described herein. Repetitive description of like elements employed in other embodiments described herein is omitted for sake of brevity.

At 802 of computer-implemented method 800, a voltage droop at a first area of a processor core can be detected (e.g., via the first voltage sensor 122, etc.) For example, a processor can be divided into two or more different areas or units. At 804 of the computer-implemented method 800, electrical current can be measured via a current sensor device (e.g., via first current sensor 124, etc.), e.g., a Hall Effect sensor device, conversion of a voltage to a current across a known resistance value, etc.

At 806 of the computer-implemented method 800, the current from 804 can be employed to validate the voltage droop as disclosed herein, e.g., determining that the voltage droop is not a false positive event (e.g., via first local controller 126, etc., logic component 550, etc.) At this point, method 800 can end. Electrical current information corresponding to the detected voltage droop event can be used to validate the voltage droop where, for example, the detected voltage droop corresponds to a sufficiently significant current draw. The sufficiency of the corresponding current draw can be based on determining if the current information satisfies a rule related to sufficiency. As example, an instant current/proxy value transitioning a selectable threshold value can indicate sufficiency, a change in current per unit time transitioning a selectable threshold value can indicate sufficiency, an average current for a selectable period transitioning a selectable threshold value can indicate sufficiency, etc.

Figure 9:
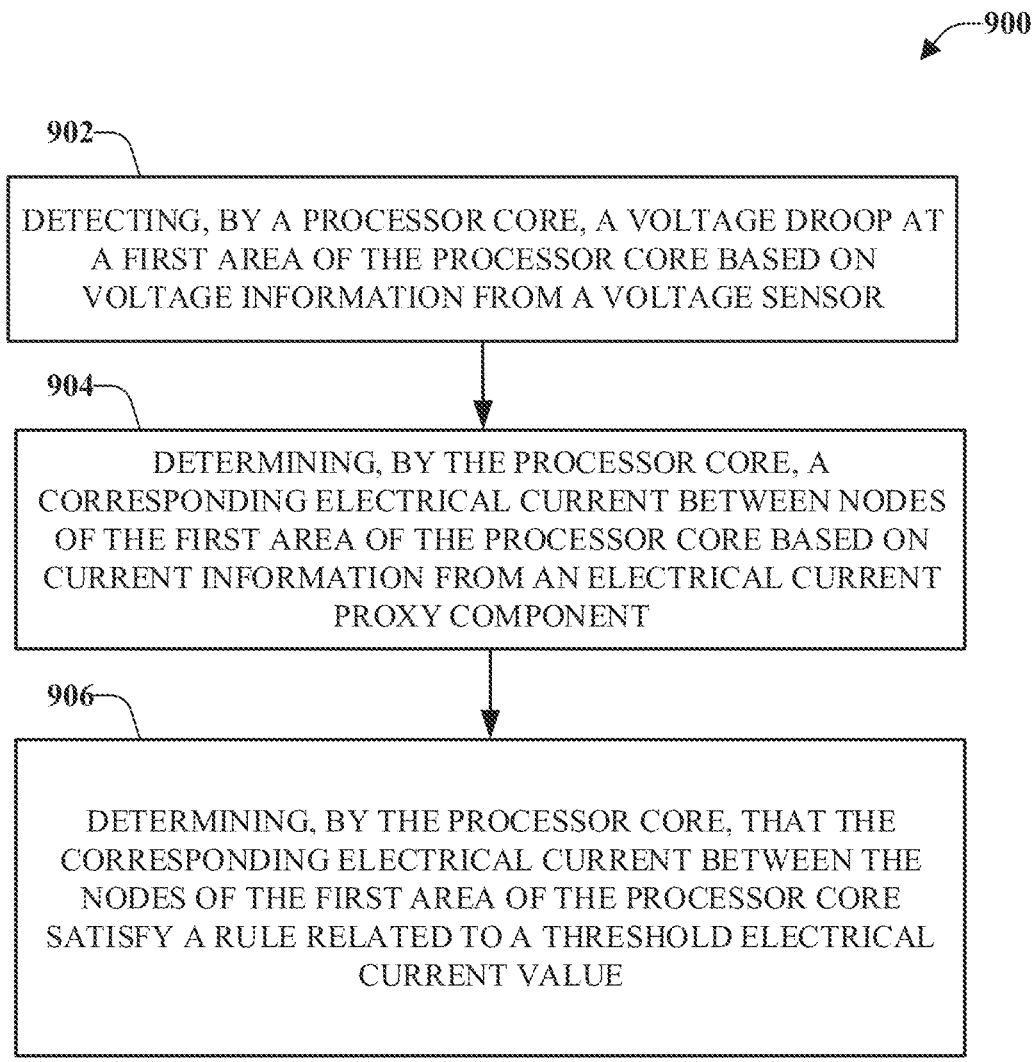
FIG. 9 illustrates a flow diagram of an example, non-limiting computer-implemented method that enables voltage management via on-chip sensors and satisfaction of a threshold electrical current rule based on electrical current measured via an electrical proxy component, in accordance with one or more embodiments described herein.

FIG. 9 illustrates a flow diagram of an example, non-limiting computer-implemented method 900 that enables voltage management via on-chip sensors and satisfaction of a threshold electrical current rule based on electrical current measured via an electrical proxy component, in accordance with one or more embodiments described herein. Repetitive description of like elements employed in other embodiments described herein is omitted for sake of brevity.

At 902 of computer-implemented method 900, a voltage droop at a first area of a processor core can be detected (e.g., via the first voltage sensor 122, etc.) For example, a processor can be divided into two or more different areas or units. At 904 of the computer-implemented method 900, electrical current can be measured via a current proxy component (e.g., via first current sensor 124, etc.), e.g., determining a number of operations per unit time, temperature, etc.

At 906 of the computer-implemented method 900, the current proxy information from 904 can be employed to validate the voltage droop as disclosed herein, e.g., determining that the voltage droop is not a false positive event (e.g., via first local controller 126, etc., logic component 550, etc.). At this point, method 900 can end. Electrical current proxy information corresponding to the detected voltage droop event can validate the voltage droop where, for example, the detected voltage droop corresponds to a sufficiently significant current draw in view of the electric current proxy information. The sufficiency of the corresponding current draw can be based on determining if the current proxy information satisfies a rule related to sufficiency. As example, a current proxy value transitioning a selectable threshold value can indicate sufficiency, a change in current per unit time (as determined/inferred via the current proxy information) transitioning a selectable threshold value can indicate sufficiency, an average current (as determined/inferred via the current proxy information) for a selectable period transitioning a selectable threshold value can indicate sufficiency, etc.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
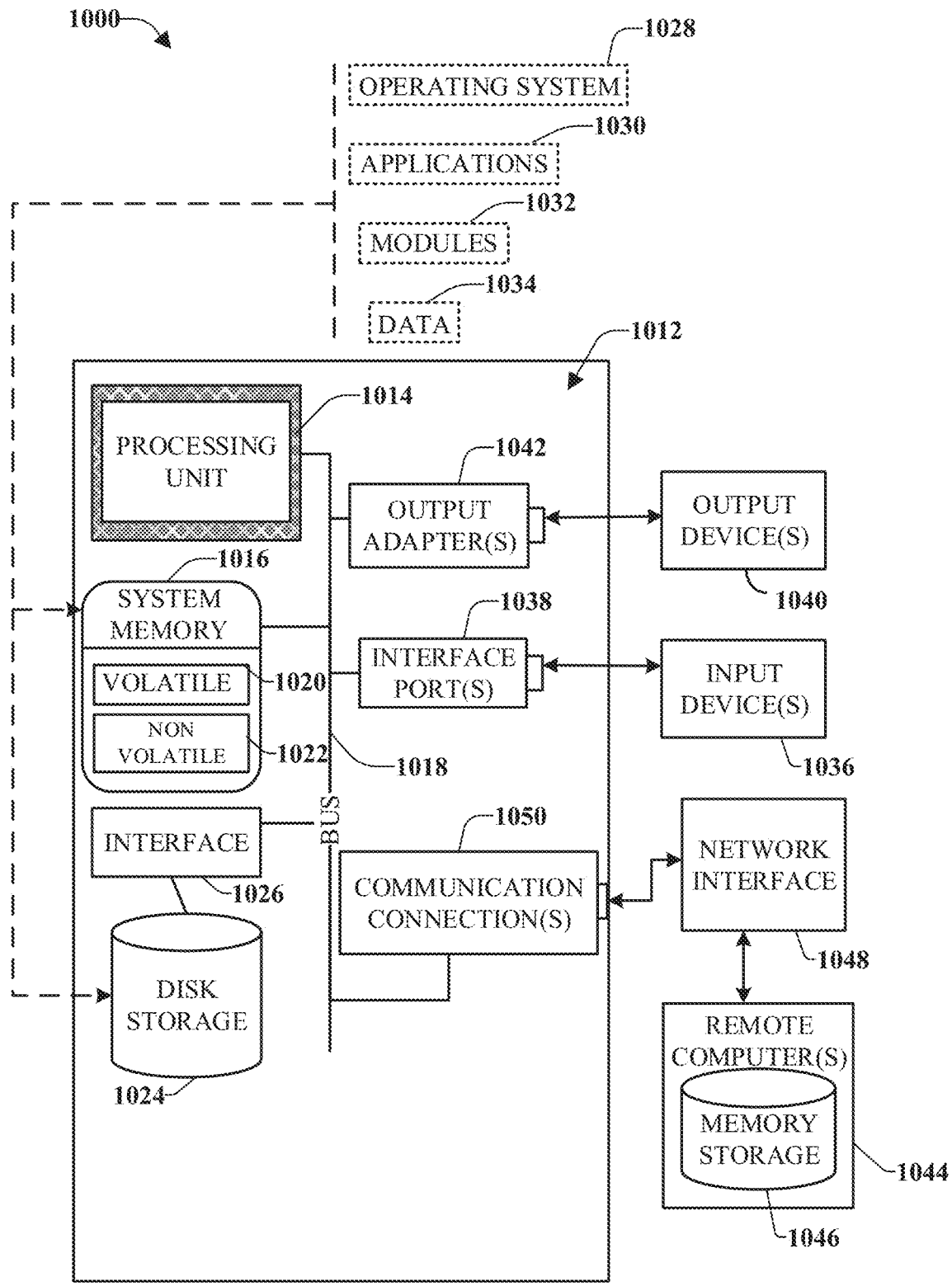
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. Repetitive description of like elements employed in other embodiments described herein is omitted for sake of brevity.

FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 can couple system component(s) including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device (s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device (s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible embodiments of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative embodiments, the functions noted in the blocks can occur out of the order noted in the Figures. For example, two blocks shown in succession, in fact, can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or may, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a first processor core of a plurality of processor cores;
    a voltage noise sensor of a plurality of voltage noise sensors;
    a current proxy sensor of a plurality of current proxy sensors, wherein the voltage noise sensor and the current proxy sensor is located in and assigned to the first processor core; and
    a processor that:
        determines a power supply noise information and a power supply voltage slope at the first processor core of the plurality of processor cores, wherein the power supply noise information and the power supply voltage slope is measured by the voltage noise sensor located in the first processor core, and wherein the voltage noise sensor is one of the plurality of voltage noise sensors located in respective processor cores;
        determines a value of an electrical current between nodes of the first processor core, wherein the value of the electrical current between nodes of the processor are calculated by the current proxy sensor located in the first processor core, and wherein the current proxy sensor is one of the plurality of current proxy sensors located in respective processor cores, wherein determining the value of the electrical current comprises inferring the value of the electrical current based on a non-current criterion comprising a number of operations per unit time, wherein the number of operations per unit time is determined as a proxy for electrical current;
        combines information from multiple types of sensors associated with the first processor core to determine whether to apply a mitigation procedure for the first processor core, wherein the multiple types of sensors are the voltage noise sensor and the current proxy sensor for the first processor core, and processes the power supply noise information, the power supply voltage slope and the value of the electrical current between nodes of the first processor core; and
        that selectively applies the mitigation procedure at the first processor core comprising throttling a number of instructions per unit time to reduce current drawn per unit time, wherein selective application of the mitigation procedure is based on:
            an evaluation of the power supply noise information, the power supply voltage slope and the value of the electrical current between the nodes of the first processor core;
            a determination that the evaluation is not of a false positive event; and
            a determination of whether the value of the electrical current is ramping up and how high the value of the electrical current is, wherein if the value of the electrical current is not ramping up or is not greater than a defined threshold, overwriting a decision to apply the mitigation procedure and forgoing enabling of the mitigation procedure.

2. The system of claim 1, wherein the processor also determines a magnitude and a rate of change of the value of the electrical current over a defined time interval, and applies the mitigation procedure based on the magnitude and the rate of change, and wherein the processor also broadcasts to one or more neighbors of the first processor core the decision regarding whether to apply the mitigation procedure at the first processor core.

3. The system of claim 1, wherein the voltage noise sensors digitally measure the power supply voltage slope value at a defined voltage value, and wherein the processor also broadcasts to one or more non-neighbors of the first processor core the decision regarding whether to apply the mitigation procedure at the first processor core.

4. The system of claim 1, wherein the processor also broadcasts, to at least a second processor core of the processor, an indication of an application of the mitigation procedure at the first processor core.

5. The system of claim 1, wherein the processor also prevents an implementation of the mitigation procedure based on a determination that the value of the electrical current generated by the first processor core is not undergoing an upward trend.

6. The system of claim 1, wherein the processor also prevents an implementation of the mitigation procedure based on an independent determination that the value of the electrical current between the nodes of the first processor core does not satisfy a rule related to a selected electrical current value.

7. The system of claim 1, wherein the mitigation procedure reduces a power consumption of the processor.

8. A computer-implemented method, comprising:
    measuring, by a first processor core, a power supply information by a voltage noise sensor of a plurality of voltage noise sensors, wherein the voltage noise sensor is located in the first processor core;
    measuring, by a sensor located in the first processor core that is distinct from the voltage noise sensor in the first processor core, a non-current criterion comprising a number of operations per unit time, wherein the number of operations per unit time is determined as a proxy for a value of an electrical current generated by the first processor core;
    applying, based on the measuring by the voltage noise sensor and based on the sensor, by the first processor core, a mitigation countermeasure at the first processor core in response to a determination that a combination of the power supply information and the value of the electrical current indicates a presence of a voltage droop at the first processor core below a first selectable threshold level and in response to a determination that a false positive condition is not detected; wherein the mitigation countermeasure comprises load balancing across processor cores to processor cores having less operational burden thereby reducing the voltage droop at the first processor core, and reducing a timing margin to reduce current drawn per unit time, and wherein the first selectable threshold level is based on a threshold voltage slope level; and selecting a second selectable threshold level, wherein the selecting the second selectable threshold level is based on the false positive condition being detected.

9. The computer-implemented method of claim 8, wherein the measuring the power supply information comprises:

distributing one or more of the plurality of voltage noise sensors throughout the first processor core, wherein the one or more of the plurality of voltage noise sensors measure respective power supply values and respective power supply voltage slopes; and receiving, by the first processor core, the respective power supply values and the respective power supply voltage slopes from the one or more voltage noise sensors.

10. The computer-implemented method of claim 8, wherein the measuring the value of the electrical current comprises:

distributing one or more electrical current proxy sensors throughout the first processor core, wherein the one or more electrical current proxy sensors determine respective values of the electrical current between nodes of the first processor core; and receiving, by the first processor core, the respective values of the electrical current from the one or more electrical current proxy sensors.

11. The computer-implemented method of claim 8, wherein the measuring the value of the electrical current comprises:

distributing one or more electrical current sensors throughout the first processor core, wherein the one or more electrical current sensors measure respective values of the electrical current between nodes of the first processor core; and receiving, by the first processor core, the respective values of the electrical current from the one or more electrical current sensors.

12. The computer-implemented method of claim 8, further comprising:

notifying, by the first processor core, information related to the mitigation countermeasure applied at the first processor core and to at least a second processor core.

13. The computer-implemented method of claim 8, wherein the applying the mitigation countermeasure comprises reducing a power consumption of a processor based on a corresponding reduction of an applied voltage margin at the first processor core.

14. A computer program product that facilitates management of a voltage via on-chip sensors, the computer program product comprising a computer readable storage medium having program instructions embodied therewith, the program instructions are executable by a processor core to cause the processor core to:

determine power supply noise information and a power supply voltage slope at a first processor core of the plurality of processor cores, wherein the power supply noise information and the power supply voltage slope is measured by a voltage noise sensor located in the first processor core, and wherein the voltage noise sensor is one of a plurality of voltage noise sensors located in respective processor cores;

determine a value of an electrical current between nodes of the first processor core, wherein the value of the electrical current between nodes of the processor are calculated by a current proxy sensor located in the first processor core, and wherein the current proxy sensor is one of a plurality of current proxy sensors located in respective processor cores, wherein determining the value of the electrical current comprises inferring the value of the electrical current based on a non-current criterion comprising a number of operations per unit time, wherein the number of operations per unit time is determined as a proxy for electrical current;

combine information from multiple types of sensors associated with the first processor core to determine whether to apply a mitigation procedure for the first processor core, wherein the multiple types of sensors are the voltage noise sensor and the current proxy sensor for the first processor core, and process the power supply noise information, the power supply voltage slope and the value of the electrical current between nodes of the first processor core; and that selectively apply the mitigation procedure at the first processor core comprising throttling a number of instructions per unit time to reduce current drawn per unit time, wherein selective application of the mitigation procedure is based on:

an evaluation of the power supply noise information, the power supply voltage slope and the value of the electrical current between the nodes of the first processor core;

a determination that the evaluation is not of a false positive event; and a determination of whether the value of the electrical current is ramping up and how high the value of the electrical current is, wherein if the value of the electrical current is not ramping up or is not greater than a defined threshold, overwriting a decision to apply the mitigation procedure and forgoing enabling of the mitigation procedure.

* * * * *